United States Patent [19]
Miki et al.

[11] Patent Number: 6,052,776
[45] Date of Patent: Apr. 18, 2000

[54] BRANCH OPERATION SYSTEM WHERE INSTRUCTIONS ARE QUEUED UNTIL PREPARATIONS IS ASCERTAINED TO BE COMPLETED AND BRANCH DISTANCE IS CONSIDERED AS AN EXECUTION CONDITION

[75] Inventors: Yoshio Miki, Kodaira; Kentaro Shimada, Kawasaki; Makoto Hanawa, Niza, all of Japan

[73] Assignee: Hitachi, Ltd., Tokyo, Japan

[21] Appl. No.: 08/951,638

[22] Filed: Oct. 16, 1997

[30] Foreign Application Priority Data

Oct. 18, 1996 [JP] Japan ................................. 8-275813

[51] Int. Cl.⁷ ................................................. G06F 15/00
[52] U.S. Cl. ..................... 712/233; 712/233; 712/234; 712/235; 712/239
[58] Field of Search ..................... 712/213, 234, 712/237–241; 711/159

[56] References Cited

U.S. PATENT DOCUMENTS

| | | | |
|---|---|---|---|
| 5,517,628 | 5/1996 | Morrison | 712/234 |
| 5,623,615 | 4/1997 | Salem et al. | 712/238 |
| 5,659,722 | 8/1997 | Blanner | 395/581 |
| 5,701,435 | 12/1997 | Chi | 711/159 |
| 5,734,881 | 3/1998 | White | 712/238 |
| 5,799,180 | 8/1998 | Shiell | 712/234 |
| 5,838,961 | 11/1998 | Smith | 712/233 |

FOREIGN PATENT DOCUMENTS

| | | |
|---|---|---|
| 2-275532 | 11/1990 | Japan . |
| 7-239781 | 9/1995 | Japan . |
| 7-306785 | 11/1995 | Japan . |

OTHER PUBLICATIONS

Motorola, "PowerPC Microporcessor Family: The Programmer's Reference Guide", Motorola, pp. 5–15, Oct. 1995.
"PowerPC 604e RISC User's Manual", IBM, 1–3–6–45, Mar. 1998.
"IBM Introduces PowerPC microprocessor att 225 MHz", http://www.chips/news/604e.annc.html, Jul. 22, 1996.
PowerPC 603e Risc Microprocessor Technical Summary Motorola and IBM http://www.ibm.com, Feb. 1996.
"Power and Power PC" by Shlomo Weiss, et al. 1994 pp. 142–149.
Computer Architecture A Quantitative Approach by David A. Patterson, 1996 pp262–309.

Primary Examiner—Meng-Ai T. An
Assistant Examiner—Stacy Whitmore
Attorney, Agent, or Firm—Antonelli, Terry, Stout & Kraus, LLP

[57] ABSTRACT

A method of effecting a branch operation without the need of instruction fetching is carried out according to the taken/untaken branch with respect to a program containing plural branch instructions, and the method is performed by an apparatus information processing. By detecting a branch instruction stored in an instruction buffer, determining its branch distance and branch condition, and if the branch distance is less than a predetermined positive distance, by then providing that branch condition as an execution condition for the instruction located within said predetermined distance to store in an instruction register, a series of instructions succeeding that branch instruction can be processed into a conditional instruction in the apparatus. The instructions may be continuously executed without refetching instructions, in both cases that a branch condition is taken and untaken. Also, the penalty of miss-prediction of a branch will be minimized.

9 Claims, 12 Drawing Sheets

FIG. 11

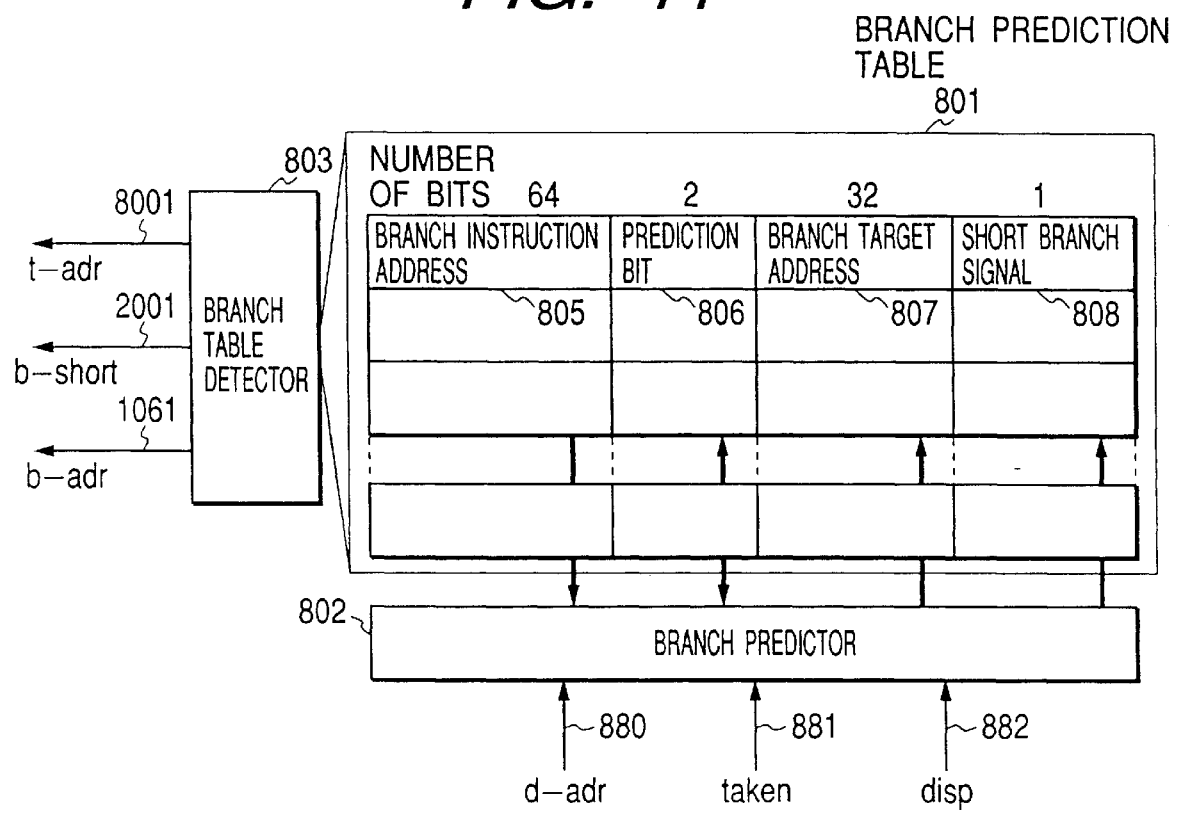

FIG. 12

| INPUT | | | OUTPUT | | |
|---|---|---|---|---|---|
| PREDICTION BIT | TAKEN SIGNAL | BRANCH DISTANCE (disp) | SHORT FLAG | PREDICTION BIT | PREDICTION JUDGE |
| 00 | BRANCH UNTAKEN | SHORT | 1 | 00 | NOT BRANCHING |
| 00 | BRANCH TAKEN | LONG | 0 | 01 | NOT BRANCHING |
| 01 | BRANCH UNTAKEN | SHORT | 1 | 00 | NOT BRANCHING |
| 01 | BRANCH TAKEN | LONG | 0 | 10 | BRANCHING |
| 10 | BRANCH UNTAKEN | SHORT | 1 | 01 | NOT BRANCHING |
| 10 | BRANCH TAKEN | LONG | 0 | 11 | BRANCHING |
| 11 | BRANCH UNTAKEN | SHORT | 1 | 10 | BRANCHING |
| 11 | BRANCH TAKEN | LONG | 0 | 11 | BRANCHING |

| INPUT | | OUTPUT | |
|---|---|---|---|
| PREDICTION JUDGE | BRANCH DISTANCE | SPECULATIVE EXECUTION | SECOND INSTRUCTION BUFFER |
| BRANCH TAKEN | SHORT | NOT EXECUTED | NOT FETCHED |
| BRANCH TAKEN | LONG | NOT EXECUTED | FETCHED |
| BRANCH UNTAKEN | SHORT | EXECUTED | NOT FETCHED |
| BRANCH UNTAKEN | LONG | EXECUTED | FETCHED |

FIG. 15

| INPUT | | OUTPUT | |
|---|---|---|---|
| PREDICTION JUDGE | BRANCH DISTANCE | SPECULATIVE EXECUTION | SECOND INSTRUCTION BUFFER |
| BRANCH TAKEN | SHORT | EXECUTED | NOT FETCHED |
| BRANCH TAKEN | LONG | NOT EXECUTED | FETCHED |
| BRANCH UNTAKEN | SHORT | EXECUTED | NOT FETCHED |
| BRANCH UNTAKEN | LONG | EXECUTED | FETCHED |

FIG. 16

| INPUT | | | OUTPUT |
|---|---|---|---|
| PREDICTION JUDGE | BRANCH DISTANCE | AMOUNT OF INSTRUCTION RECORDS | SPECULATIVE EXECUTION |
| TAKEN | SHORT | =< LIMITED VALUE | NOT FETCHED |
| TAKEN | LONG | =< LIMITED VALUE | NOT FETCHED |
| UNTAKEN | SHORT | =< LIMITED VALUE | FETCHED |
| UNTAKEN | LONG | =< LIMITED VALUE | FETCHED |
| TAKEN | SHORT | =< LIMITED VALUE | NOT FETCHED |
| TAKEN | LONG | > LIMITED VALUE | NOT FETCHED |
| UNTAKEN | SHORT | > LIMITED VALUE | NOT FETCHED |
| UNTAKEN | LONG | > LIMITED VALUE | NOT FETCHED |

BRANCH OPERATION SYSTEM WHERE INSTRUCTIONS ARE QUEUED UNTIL PREPARATIONS IS ASCERTAINED TO BE COMPLETED AND BRANCH DISTANCE IS CONSIDERED AS AN EXECUTION CONDITION

BACKGROUND OF THE INVENTION

The present invention is directed to an apparatus of the information processing industry having instruction registers for storing instructions to be executed, and the invention relates more particularly to a branch operation method for determining how to update the contents of the instruction registers when a branch instruction occurs, and to an apparatus for information processing which is adapted to achieve said branch operation method.

If a program with frequent branch operations is executed on a high speed information processing apparatus which executes instructions faster and which has a plurality of instruction execution paths, there may be a problem if the instruction supply is not adequate for high speed instruction execution, which is caused by the time required for fetching new instructions each time the series of instructions to be executed by a branch instruction vary. Remedies have been proposed for this problem; for instance, there is a technique for preliminarily detecting branch instructions in an instruction buffer, as taught by S. Weiss & J. E. Smith, "POWER and PowerPC", Morgan Kautmann Pub., Inc. 1994, pp. 144, as well as a technique for preliminarily predicting a branch instruction for determining whether or not a branch instruction may be taken or not taken, as taught by Hennesy and Patterson, "Computer Architecture: A quantitative approach" 2nd ed., Morgan Kautmann Pub., Inc. 1995, pp. 262–278.

A technique for preliminarily detecting a branch instruction in an instruction buffer or for predicting whether a branch instruction is taken or not taken may anticipate operation of branch instructions by using the instruction executing time before a branch to apparently hide the delay required when the target of an instruction fetch is changing. If branch instructions occur frequently, however, the instruction execution time itself before the branch instruction is short, so that it may be difficult to hide the fetching time with a prediction, not to mention the fact that the instruction should be refetched, if the prediction has failed, from the point of the branch instruction at which the prediction has failed, resulting in the reexecuting time being manifested as the entire execution time (penalty).

If the branch instruction is processed, as in such a technique, by controlling the target of the instruction fetching, it is inevitable for a penalty to result, i.e., the entire time for fetching an instruction is required when the branch prediction has failed.

Other techniques for solving this problem, such as conditional instructions and predicting at the time of compiling, is discussed in the second reference identified above, pp 296–308. Both techniques attempt to substantially reduce the number or the effect of branch instructions to be executed.

Conditional instructions are instructions that are activated only when a conditional register contains a specific value, or an instruction whose operation contents may vary according to a specified condition. When the instruction execution depends on a condition, the IF statement of a high level language as well as instructions to be executed under that condition may be allowed to gather together to enable a substantial reduction of the number of branch instructions.

In the predicating technique, the branch of a source program is statically predicted to determine a series of instructions which may be frequently executed. The predicted instruction sequence may be divided into several blocks each time a branch instruction appears, so that the downstream instructions will be allowed to move into an upstream block if the dependency of the input data is conserved. As can be seen, by increasing the number of instructions in a specific block, the likelihood of parallel execution in the of increased size block will be increased, so that the time to be taken for instruction fetching in the very next branch instruction may be covered by the execution time. In addition, a block reduced in size due to the displacement of instructions can be replaced with a conditional instruction. In any case, unless a static prediction is incorrect, the penalty due to branch instructions may be minimized.

As another exemplary technique for saving the time required for instruction fetching, as disclosed in the Japanese Patents Laid Open No. H2-275,532, No. S63-49,844, H7-306,785, and No. H7-239,781, there is known a method for removing the time to fetch instructions by reading branch target instructions in an instruction buffer rather than newly executing an instruction prefetching, if there is an instruction for a branch target in the instruction buffer placed in the instruction prefetcher.

SUMMARY OF THE INVENTION

As mentioned above, in the technique for processing a branch instruction in advance by using a branch prediction, since there is an instruction fetching which depends on its branch instruction, the suppression of the processing time is difficult. For example, a branch instruction exists at the top of the branching target of the exceptional operation in an integer program or a numeric program, and in an example in which such situation iterates a few times, the time needed for instruction fetching is a dominant part of the execution time. Therefore, a primary object of the present invention is to stop refetching of an instruction by a branch instruction to avoid the situation in which the execution time is defined by the instruction fetch time.

Also, if there is a branch target instruction in an instruction buffer, it may be possible to completely avoid the instruction fetching. In such a technique, the instructions placed before a branch target instruction as a sequence of instructions are all discarded. However, if the prediction of a branched target is used with the technique of read-in-advance of instructions, then it should be excepted that there may be cases in which the prediction may fail. The instructions conventionally discarded also are preferably reused as conditional instructions.

A conditional instruction is an effective means for reducing branch instructions, which is the basis of the problem. In theory all instructions included in the existing instruction set may extend to conditional instructions, however from the view point of the extension of the number of instructions, the extension can only be realized to a limited extent as a "move" instruction. In addition, current program resources should be recompiled with a compiler which supports conditional instructions, so that the reuse of the object programs and executable program resources is not allowed without modification. A prediction technique by a compiler also requires recompiling, resulting in a similar problem. As can be seen from above discussion, a second object of the present invention is to provide a branch operation method which allows existent object programs and executable program resources to be just reused.

BRIEF DESCRIPTION OF THE DRAWINGS

FIG. 11 is a diagram of a branch prediction table used in the apparatus as shown in FIG. 10;

FIG. 12 is a branch prediction table used in FIG. 11;

FIG. 15 is a modification of the speculative execution table based on branch prediction in the speculative execution control as shown in FIG. 14;

FIG. 16 is a table for a control method used when the amount of instruction records is added to the control condition of speculative execution;

DETAILED DESCRIPTION OF THE PREFERRED EMBODIMENTS

Figure 1:
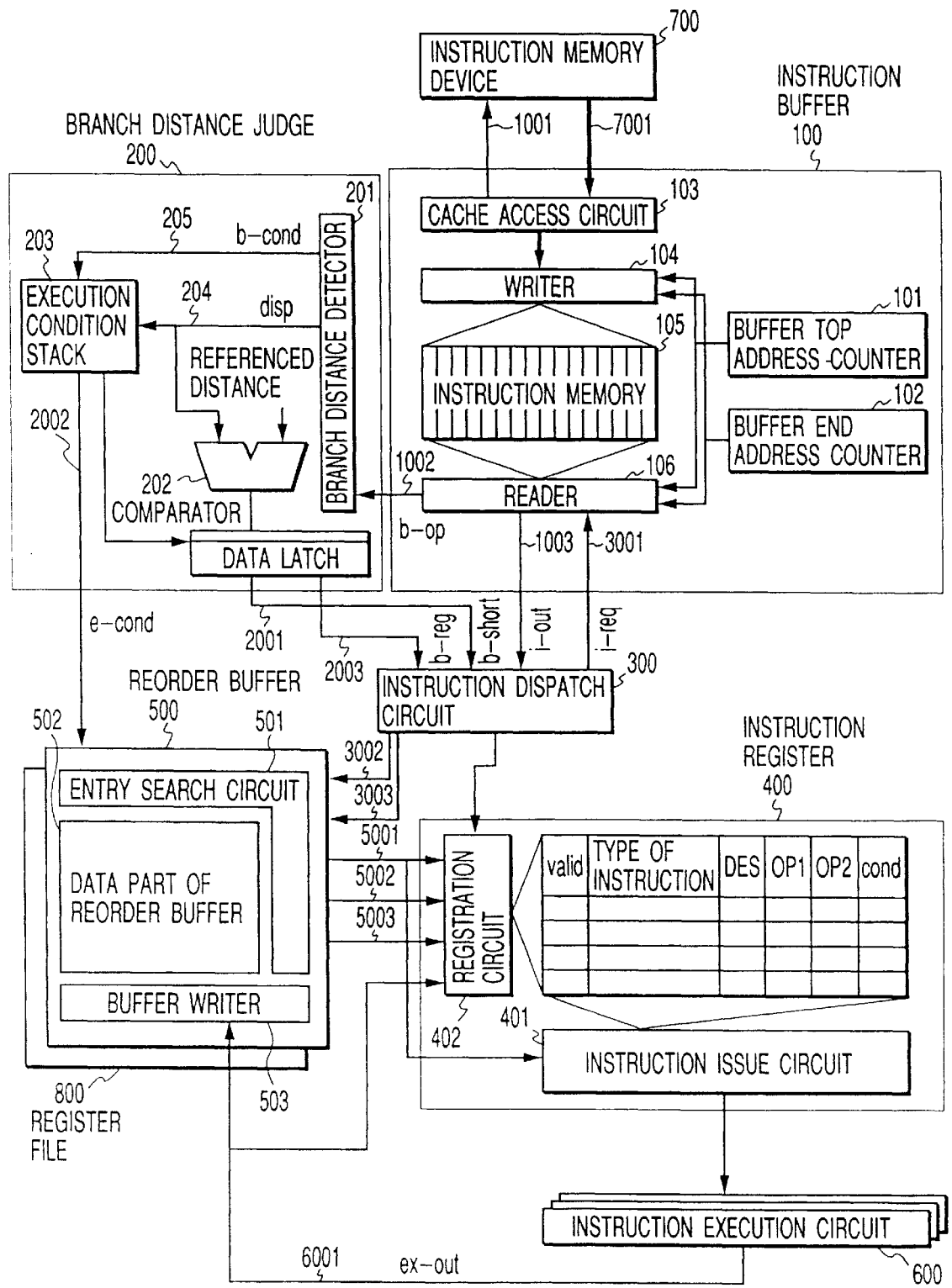
FIG. 1 is a block diagram which shows an apparatus for information processing illustrating an embodiment according to the present invention.

The preferred embodiments of the present invention will be now described with reference to the accompanying drawings.

A preferred embodiment of the present invention is an extension of the conventional functionalities of a super scalar processor. Before discussing the present invention, the operation of the super scalar processor in this embodiment will be described. A super scalar processor is a processor which may execute a plurality of instructions simultaneously within a single processor core. The operation of detecting simultaneously executable instructions and executing them is achieved by using the functionality of an instruction register 400 (generally referred to as a reservation station) and of a reorder buffer 500. The instruction register 400 stores instructions for which there is not enough input data needed for execution, and which are therefore in a waiting condition. The operand fields OP1 and OP2 in the instruction register 400 stores values corresponding to the instruction source register number, for carrying out a verification of whether or not the contents of the source register number may be referential. An instruction which has all necessary input data is transferred by an instruction issue circuit 401 to an instruction executing circuit 600.

As mentioned above, since the order of issuing (executing) instructions depends on the order in which input data is ready, the order of executing instruction specified in a program may be different from the actual order. This problem may be solved by providing the reorder buffer 500 with the ability to write back to the register file 800 the results of an operation based on the executed order. Each time the instruction dispatcher 300 decodes instructions in the order of the programs, if the reorder buffer 500 requires a register to which the instruction to be decoded writes the results of instruction execution, i.e., a destination register, it may generate a provisional number to replace the number of that destination register.

On the other hand, the entire reorder buffer 500 is structured as a first-in first-out queue. The provisional number above corresponds to the order of the queue elements. The results of execution by the instruction executing circuit 600 are stored in the reorder buffer location pointed to by the provisional number appended at the time of instruction decoding. The reorder buffer always monitors the oldest queue element stored therein so as to transfer the execution results to the register file 800 to be written by the instruction only when the oldest element is filled by the results of instruction execution. The monitoring of the oldest instruction ensures the program order of the data to be written into the register file.

As mentioned above, the number of the destination register is aliased so that it may be suitable if the source register stored in the instruction register 400 also is managed by an alias. The number (alias) of the destination register of any one preceding instruction tends to be waited for in the instruction register 400. To accomplish this, the reorder buffer has also a conversion function for the number of the source register. When the number of the source register is given by the instruction dispatcher 300 to the reorder buffer 500 as an inquiry, the reorder buffer searches the register number field 505 for all queue elements. In the register number field 505, the register number written in the instruction word before converting the number of the destination register, i.e., the real name in the register file 800, is recorded.

As a result of this searching, if a register number is found in the reorder buffer which is identical to the number of the source register, then there is a preceding instruction which attempts to update that register, so that the aliased number identical to that given to the destination register is allocated to the source register. As a result of the searching, if the identical register number is not found in the reorder buffer, indicating that the contents of the source register are determined as input data, then the contents of the corresponding register number in the register file are returned as a response to the number conversion of the source register, rather than the alias.

If the input data is determined in the OP1 and OP2 fields of the instruction register 400 corresponding to the number converting function of the source register, that numerical value of the data is stored, and if not, the number of the destination register as an alias given to the preceding instruction is stored. In this embodiment of the present invention, the queue of the reorder buffer 500 is defined as the data-part of the reorder buffer 500, the entry number of each respective element in the data-part of the reorder buffer corresponds to the alias given to the destination register.

Execution of Conditional Instructions:

Conditional instructions (also referred to as predicate instructions) are instructions that are to be executed only when a specific condition is met. More specifically, although these instructions are to be executed, their results should tee effective to registers and memories only when the executing condition has been met. The present invention automatically generates conditional instructions, so that the instruction sets do not need to have conditional instructions incorporated therein. However since the method of managing the execution after generating conditional instructions, as provided in this embodiment, is an extension of the processor having predicate instructions, the execution of the conditional instructions (predicate execution) will be described now, before describing details of the present invention.

In the basic operation, the conditional instructions are executed similar to ordinary instructions, the execution condition is checked at any of the steps between the instruction dispatching and the writing to registers, and, if the execution condition is not satisfied, the instruction itself or the result of execution thereof will be eliminated. A conditional execution using an instruction register 400 will be described herein below. The conditional instructions are stored into the instruction register 400 similar to ordinary instructions. However, the instruction register 400 is provided with a "cond" field dedicated to conditional instructions.

The simplest method for managing the execution of conditional instructions is that only one conditional register is predetermined for use in management of the execution of conditional instructions to store the contents of that conditional register into the "cond" field In the method of issuing instructions for a super scalar processor, as indicated above, instructions are executed in the order in which the associated input data is ready in the instruction register 400. Here, another condition is added for execution in the order in which associated input data is ready and that the contents of both the conditional register and the "cond" field are matched.

In the above method, there arises two problems: one is that the method is unlikely to generate timings for removing instructions for which the executing condition has-been untaken and that are insignificantly waiting in the instruction register 400; and another is that this method cannot deal with the executing condition indicated by the combination of a plurality of condition registers. To solve these problems, the "cond" field has to store key data which may indicate both the taken or untaken executing condition and its determined timing, rather than directly describing the executing condition. In this embodiment, the number of the condition registers referenced by the conditional branch instructions are used for this key data. Because a conditional instruction is a sequential instruction following a conditional branching instruction, i.e., a condition is added that an instruction placed at an untaken block will not be branched by any branch instruction. Thus, when the branch condition of a branch instruction is determined, the execution condition of a subsequent conditional instruction is also determined, so that when the execution of a branch instruction is terminated, if the termination of instruction execution is communicated to the instruction register 400, similar to any other instructions, it will be possible to determine whether the conditional instruction waiting in the instruction register 400 is to be removed or executed.

However, when writing the number of the condition register into the "cond" field, it cannot be determined whether or not the execution condition is taken or untaken only from that information. In this embodiment the execution condition is stored in the data-part of the reorder buffer. That is, when dispatching a branch instruction from the instruction dispatcher 300, one entry is reserved in the data part of the reorder buffer for a branch instruction, similar to an instruction with a destination register. The execution condition and condition register are respectively stored in the register number field 505 and condition flag field 507. This makes it possible to sequentially (1) terminate a branch instruction, (2) determine whether an execution condition is taken or untaken in the reorder buffer, and (3) remove or execute a conditional instruction in the instruction register, thereby resolving the above mentioned problem.

First Embodiment

While the basic operation as a super scalar processor and the method of management of the execution of the conditional instruction of the present embodiment has been described above, the primary object of the present invention, i.e., the automatic generation of a conditional instruction, from a branch instruction will be described herein below.

FIG. 1 shows an apparatus for information processing illustrating an embodiment according to the present invention. An instruction buffer 100 stores a plurality of instructions fetched from an instruction memory 700. The instructions contained in the instruction buffer 100 will be transferred to an instruction dispatcher 300. Also, only the branch instructions in the instruction buffer 100 will be transferred to the branch distance judge unit 200 for decoding information on the condition register for storing that branch condition, the conditional flag, and the branch distance contained in the branch instruction. A comparator 202 provided in the branch distance judge unit 200 compares a referenced distance corresponding to the number of predetermined instructions to be executed conditionally with the branch distance to generate a short branch signal (b-short) 2001 if the branch distance is less than the referenced distance.

The referenced distance is used by the branch distance judge unit 200 for the purpose of defining the range of conditional execution. The referenced distance may be fixedly recorded in the comparator 202 as a specific value for the apparatus for information processing of the present embodiment, or it may be written to the circuit by using a privilege. The dimension of the referenced distance is preferably less than 2n, wherein n is the number of instructions that the instruction buffer 100 may store. This is for protecting the instructions to be executed from interference by the execution of the conditional instructions. The reason why the distance is limited to a greater number then n is that the likelihood of the presence of the branch target in the instructions to be fetched is frequent in usual programs, and even in such a case it is advantageous to not alter the fetch address, rather than to create a branch penalty.

The short branch signal (b-short) 2001 is available until the instructions of the branch target after the branch instruction have been read from the instruction buffer 100 to the instruction dispatcher 300. Meanwhile, the following operation will be performed.

Figure 5:
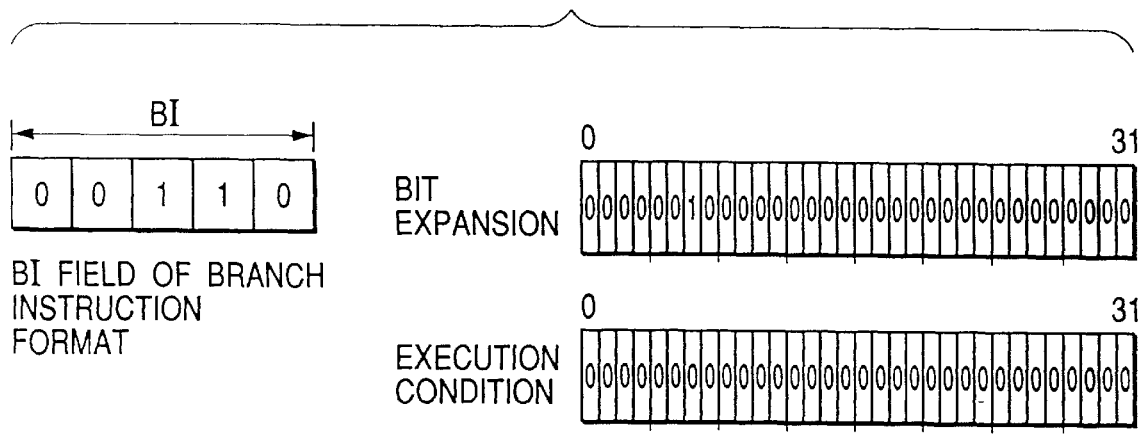
FIG. 5 is a diagram showing the relationships between a BI field of a branch instruction and a branch condition.

The instruction dispatcher 300 adds an execution condition if the short branch signal (b-short) 2001 is available for the instructions read from the instruction buffer 100. An instruction with an execution condition is herein defined as a conditional instruction. The conditional instruction is an instruction which is executed if the condition register is in a condition indicated by the execution condition. In accordance with the present invention, the execution condition will be generated from a branch instruction. FIG. 5 shows a diagram of the relationships between a BI field of a branch instruction and a branch condition. The BI field is formed by five binaries, expressing any numeric value ranging from 0 to 31. The BI field may therefore be thought of as an expression of a specific value in 32 bits. In the example shown in FIG. 5, a number corresponding to a decimal 6 is specified in the BI field, which may be thought of as pointing to the seventh bit position from the leftmost position of the 32 bits.

Figure 4:
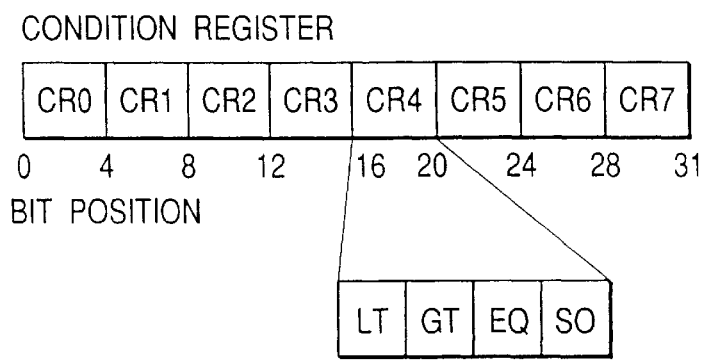
FIG. 4 is a diagram of a conditional register.

In the embodiment shown, these 32 bits correspond directly to the condition register 32 bits shown in FIG. 4. The architectural limit of 32 bits in the condition register is divided into 8 condition registers of 4 bits, so that the example of the BI field shown in FIG. 5 indicates that the EQ bit in the condition register CR1 is set. Here it is to be noted that "LT", "GT", and "EQ" indicates "less than", "equal than" and "equal to" as to a numeric comparison result, respectively. The so bit is not used in this embodiment.

The method of specifying condition registers and branching conditions contained in the branch instruction words has been described. The execution condition as described above is generated from this benching condition. The execution condition is a group of instructions to be executed when not branched, as apparent from the definition of the conditional instruction. Thus, the execution condition is a logical NOT (negation) of the branch condition. In the example of FIG. 5, the branch condition was "EQ bit of the condition register CR1 sets to 1". Thus the execution condition will be the time when "EQ bit of the condition register CR1 is set to 0".

The execution condition is generated in a branch distance detector 201 in the branch distance judge unit 200. The number of the condition register storing the condition is transferred to the instruction dispatcher 300 as a b-reg signal 2003. The execution condition is stored in an execution condition stack 203 as b-cond 205. The execution condition stack 203 is a conditional instruction which is executed only when a plurality of branch instructions will not branch, i.e., which is for generating an execution condition for an instruction placed at the untaken block nested several times. The instruction dispatcher 300 not only adds the execution condition as described above, but also decodes the destination register number storing the instruction result and the source register number storing input data.

In the instruction register 400, the instructions from the instruction dispatcher 300 are stored along with the information on the type of instruction and the decoded register number. The register number stored in the instruction register is the number replaced at the reorder buffer 500.

In general, the machine instruction specifies the number of a source register storing input data for the desired operation and of a destination register storing the result of operation. The reorder buffer 500 is used for converting and managing the source register number and the destination register number specified in a machine instruction. The register number will be converted as follows. The destination register number as well as the source register number are given to the reorder buffer 500 as a query.

In response to the query of the destination register number, new entry counter 504 is updated so that the updated value becomes the new number after conversion of the destination register. The new number is also used as the entry number of the data part of reorder buffer 502, i.e., one converted destination register number reserves one entry, and the value before conversion of the destination register number is stored in the register number field 505.

In response to the query on the source register number, if, at the time of the query, there is a preceding instruction being executed which uses that source register as a destination register, the number assigned to the destination register of the preceding instruction will be the number after conversion of the source register. If there is no preceding instruction updating the contents of the source register, the number data indicated by the register number in the register file 800 will become the conversion result of the source register number. Whether there is such a preceding instruction or not is determined by associative searching based on the source register number provided to the data part of reorder buffer 502.

When converting the destination register number, the number before conversion of the destination register is already stored in the register number field 505 of the data part of reorder buffer 502. If the source register number exists in the data-part of the reorder buffer, a current instruction updating a source register is already registered.

If there is no data corresponding to the same register number in the data-part of the reorder buffer, indicating that there is no preceding instruction updating that source register, the numeric data stored in the appropriate register number location in the register file 800 is returned as the result of the register number conversion.

The reorder buffer also performs the restoring the data after operation in the executed order. The numeric result of operation obtained by the instruction execution circuit 600 is written back to the numeric field 506 of the data part of reorder buffer 502, treating the number after conversion of the destination register as the entry number. At the time of completion of this writing back, the conversion of the destination register number and the provisional number will be useless so that the numeric data in the numeric field 506 will be written into the destination register in the register file 800. The operation and the functionality of the reorder buffer as described above are a standard function in the super scalar processor.

In the reorder buffer according to the present invention, there are newly provided fields for a condition flag 507 and a valid flag 508 for operating condition instructions. In the condition flag field 507, an execution condition is stored in the case of an instruction which is a conditional instruction or a branch instruction when converting the destination register number. The valid flag 508 indicates whether or not the operation result of the numeric field 506 is available for writing back to the register file 800. Thus, in the conditional instruction, only when the execution condition is taken, the operation is completed, and the numeric field 506 is filled with the operation result, will the resulting value be written back to the register file.

In accordance with the present invention, similar to the generic superscalar processor, the instruction dispatch circuit 300 and the instruction register 400 are used to accomplish an out-of-order execution of instructions. The instruction register 400 is a register for storing an instruction which is waiting for execution during computation of the contents of the source register. The instruction register 400 has the functionality of a so called reservation station for the instruction executing circuit 600 which executes instructions.

If the instruction is not a conditional instruction, the instruction register 400 sends instructions to the instruction executing circuit 600 sequentially in the order in which the source register value of the instruction has been determined. The result of the instruction execution at the instruction executing circuit 600 is stored at the position of the entry number in the data part of the reorder buffer 502 obtained in place of the destination register number. At the same time that the entry number is propagated to the instruction register 400, a registration circuit 402 in the instruction register 400 searches for an instruction having the entry number for which the execution has been just finished, so as to replace its operand field with the numeric value of the execution result. By circulating operation among the reorder buffer 500, instruction register 400, and instruction executing circuit 600, an executable instruction is generated in the instruction register 400 to continue the execution of instructions.

In the case of a conditional instruction, the operation is as follows: First, description will be provided for the branch instruction in which a condition register generally is used as a source register, according to the contents thereof, to determine whether or not an instruction branches. In the present embodiment a branch instruction is decoded and issued as an instruction for updating conditional instructions storing branch conditions in order to notify waiting instructions in the reorder buffer and instruction registers that the branch condition has been determined.

By using the same condition register for a destination register as well as for a source register, an entry number is stored from the reorder buffer 500 and stored into the instruction register 400. That is, the destination register number is converted as described above, and the branch condition is awaited for being determined at the instruction register. Next, in the instruction executing circuit 600, an instruction determining a branch condition, such as for example a comparison instruction, is executed, the value of the operand field of a branch instruction which is ready in the instruction buffer is determined and the branch instruction is sent from the instruction register 400 to the instruction executing circuit 600. In the present embodiment, a condition register specified as an instruction word is treated as a destination register. However, the contents of a condition register need not be altered as a result of execution of the branch instruction.

The result of execution of branch instruction is sent to the reorder buffer 500 for searching for the destination register number conversed et the date pert of the reorder buffer 502 to determine an entry. At the time when a branch instruction is registered to the reorder buffer, the execution condition of a conditional instruction is stored in the condition flag field 507 at the position of that entry number. The value stored in the numeric field 506 as the result of a branch instruction is compared with the value stored in the condition flag field 507, and it is determined that the instruction is executable as a conditional instruction if these two values match.

Figure 9:
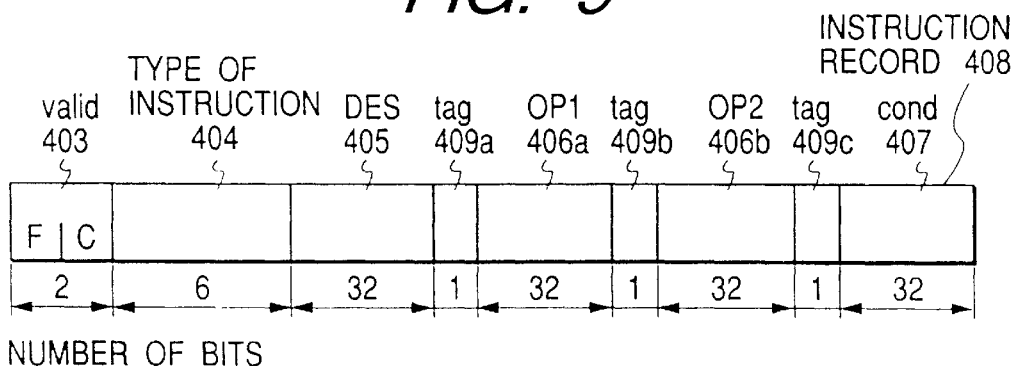
FIG. 9 is a diagram of an instruction record used in the instruction registers.

The entry number of the data part of reorder buffer 502 which is searched while terminating a branch instruction is transferred to the instruction register 400 for searching in the "cond" field 407 as shown in FIG. 9. This operation is for discriminating between executables and unexecutables among conditional instructions waiting in the instruction register. In the "cond" field 407, the entry number of the data part of reorder buffer 502, replaced at the reorder buffer 500 with respect to the destination register of the branch instruction, which decides an execution condition, is stored. If the conditional instruction is determined to be executable according to the comparison described above, instructions will be executed sequentially one by one such that the contents of the operand field have been determined.

Conditional instructions other than the branch instructions are, similar to the instructions without a condition, decoded at the instruction dispatcher 300 and registered to the instruction register 400. However, the conditional instructions are different in that the execution condition generated at the branch distance judge unit 200 also is registered to the instruction register 400.

The architecture and the operation of the embodiment according to the present invention as shown in FIG. 1 has been described as above overview. A more detailed description with respect to the components thereof will now be provided.

[Instruction Buffer 100]

Figure 2:
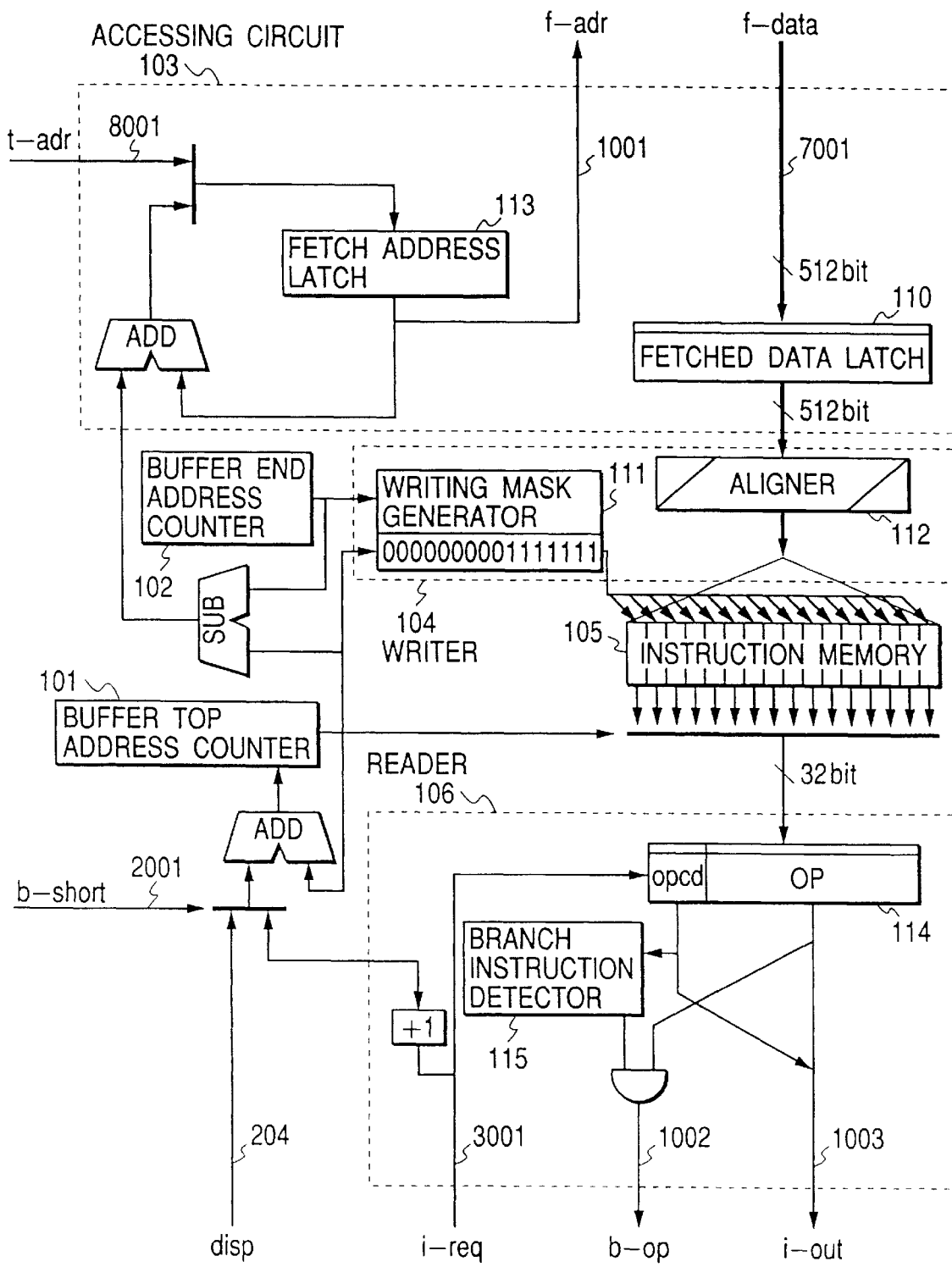
FIG. 2 is a block diagram of an instruction buffer used for the apparatus for information processing as shown in FIG. 1.

FIG. 2 illustrates an example of the instruction buffer 100.

Figure 3:
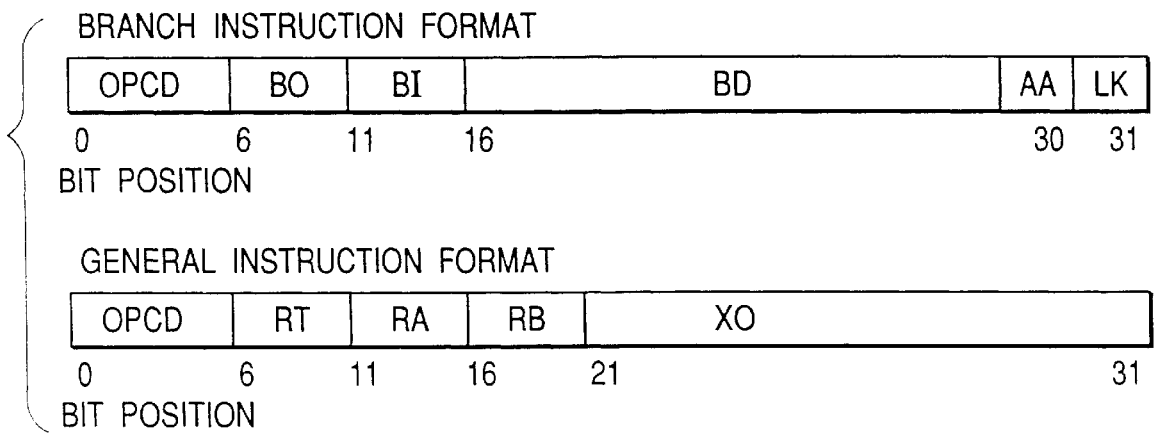
FIG. 3 is a diagram of an instruction format used in the embodiment according to the present invention.

The instruction format used in the present embodiment will be now described. The format of the branch instructions and general instructions is shown in FIG. 3. As shown in the FIG. 31 all of the instructions are expressed in 32 bits. In the instructions, the 0th bit through 5th bit designate an opcode (OPCD) of the instruction type.

In the general instructions, three 5 bit codes following the opcode respectively specify one destination register (RT) storing the result of operation, and source registers (RA, RB) to be supplied with an input value of the operation. In addition, the format for the general instructions provides an extended operand (XO) for storing any necessary data other than that described above at this location for each instruction. The branch instruction format will be described later.

All instructions are stored within the instruction memory 700 according to its executing order. When a fetch address 1001 is specified by the accessing circuit 103, sixteen consecutive instructions from that specified address are latched to the fetched data latch 110 as the fetched data 7001 (32 bits×16=512 bits).

The primary function of the instruction buffer 100 is accomplished by the instruction storage 105. The instruction storage 105 is comprised of memory elements which can store sixteen instructions, each of the elements having consecutive addresses. The storage may be thought of as a ring buffer. Thus, the valid data in the instruction storage 105 is in a consecutive area from the location pointed to by the buffer top address counter 101 to the location pointed to by the buffer end address counter 102. Any new instructions may be stored in the remaining area. The actual position where a new instruction is stored will be generated by the writing mask generator 111 based on the values of the buffer top address counter 101 and the buffer end address counter 102.

The writer 104 comprises a writing mask generator 115 and an aligner 112 for storing the instruction in the fetched data latch 110 to the instruction storage 105. At the writing mask generator 111, 16 bit-width mask data is generated, each bit corresponding to a respective one of 16 memory elements in the instruction storage 105, in which a location available for storing any new instruction is set to 1, and a location which is unavailable is set to 0. As has been described, since the fetched data latch 110 latches sixteen instructions, the aligner 112 defines the location to store an instruction according to the mask data generated by the writing mask generator 111. In general, most eases have less than sixteen new instructions to store therein, so that the aligner 112 selects an instruction to be stored according to the defined order in the instruction memory 700.

The fetch addresses of the instructions fetched from the instruction memory 700 are managed by the fetch address latch 113 of the accessing circuit 103. There are two ways to update fetch addresses.

One of the ways is to compute the difference between the buffer top address courter 101 and the buffer end address counter 102 by using a subtractor SUB, then to calculate therefrom the number of instructions newly stored in the instruction storage 105 and finally to add the number of instructions to the number retained in the fetch address latch 113 by using an adder ADD. The other way is when the address of an instruction to be fetched is altered by the execution of a branch instruction. Although not shown in FIG. 1, as a result of executing a branch instruction, when the fetch address is altered, the instruction executing circuit 600 provides a new fetch address to the target address 8001, the fetch address latch will be updated by using this new fetch address. The fetch address obtained by either of these methods is selected for storing in the fetch address latch 113.

In the present embodiment, instructions are supposed to be read out each time as needed. As stated above, the buffer top address counter 101 points to the top address of the valid data available in the instruction storage 105. One instruction selected at that address is stored in an instruction output latch 114 of the reader circuit 106 to be output through an instruction output 1003 (i-out) at the time when an instruction output request signal 3001 (i-req) has arrived from the instruction dispatcher 300. It should be noted that the buffer top address counter 101 is incremented by 1 to point to the very next instruction stored in the instruction storage 105, at the arrival of the instruction output request signal 3001.

The instruction output latch 114 partially decodes instructions. The topmost 0 bit through 5 bit of the instruction bits are separated as an opcode, and the remaining operand (OP), except for the opcode, is sent to the branch distance judge 200 to serve as a branch operand 1002 (b-op) if the instruction is determined by the branch instruction detector 115 to be a branch instruction. For the general instructions, all of the instruction bits are output through the instruction output 1003 to the instruction dispatcher 300.

In the present embodiment according to the present invention, the extended function as described above also is instantiated. Since the read-out of instructions is performed one by one, the buffer top address counter 101 is usually incremented by +1. However, in case a branch target instruction is already stored in the instruction storage 105, the instruction fetching followed by the update of the fetch address latch 113 as described above is not necessarily needed again. Such a situation is determined by the branch distance judge 200 and is indicated by enabling the short branch signal 2001 (b-short). In such a case, a branch distance 204 (disp) is added to the buffer top address counter 101 by an adder so that the instructions that a branch instruction has jumped over will be disabled in the instruction storage 105. However, this embodiment has only the effect of saving times for refetching instructions again if the target exists in the instruction buffer. If the branch target prediction has failed and the instruction already discarded has to be performed, then the discarded instruction should be fetched again.

[Branch Distance Judge Unit 200]

The branch distance detector 201 of the branch distance judge unit 200 decodes branch instructions. The branch instruction format is as shown in FIG. 3. The 0th through 5th bits represent an opcode (OPCD), indicating the type of instruction, and the BO field of the following 6th through 10th bits, and the BI field of the following 11th through 15th bits indicate a branch condition. In the POWER architecture, the BO field may express the conditional combination with a loop counter, while in the present embodiment only a condition indicated by the BI field is used, and so a detailed description of the BO field will be omitted. The 5 bits in the BI field express decimal 0 through 31. The number 0 through 31 corresponds to the bit position in the condition register as described later, indicating that the location indicated by that number is set to 1.

FIG. 4 indicates an embodiment of a condition register. The condition register is composed of a 32 bit register divided by 8 for each of the 4 bit fields. Each field is used as an independent condition register. Each bit of the respective condition registers has attributes as LT, GT, EQ, and So. LT is the first operand, as described above in the section of general instructions, i.e., LT is set when the register contents indicated by the RA field of the instruction format is less than the object to be compared with. Similarly, GT is set to 1 when greater than the comparison object, and EQ is set to 1 when equal. SO is set to 1 if the result has overflowed.

The numeric value indicated by the BI field of the above mentioned conditional instruction format reflects 32 bits of the condition register, specifying one of the condition registers CR0–CR7 and which bit therein. The field labeled BD in the condition instruction format stores the relative address of the branch target instruction address. The AA field and the LK field are bit fields which indicate the storing of an absolute value in the BD field and are used by storing a return address before branching. The details of these fields will be omitted.

Continuing the description of the branch distance judge unit 200 shown in FIG. 1, the branch distance detector 201 reads the condition register number and the execution condition specified by the BI field of the conditional instruction to send the conditional code 205 (b-cond) to the execution condition stack 203. The conditional code is equivalent to the execution condition of the conditional instruction. The conditional code contains the condition of the branch taken or untaken with respect to the current branch instruction. The branch distance 204 is generated from the BD field and is sent to the execution condition stack 203 and to the comparator 202. In addition, as described later, since at the instruction register 400 the correspondence of a branch instruction with an instruction associated with a condition according to that branch instruction is taken through the condition register number, for this purpose the condition register number is sent to the instruction dispatcher 300 as a branch register 2003 (b-register).

Since the branch distance 204 is a direct expression by the BD field of a branch instruction, the branch distance detector 201 merely extracts the BD field. The comparator 202 compares the predetermined number of instructions to be jumped over by a branch instruction (reference distance) with the branch distance 204 to enable the short branch signal 2001 (b-short) when the branch distance is less than the reference distance (for example, 8 instructions). However, since the instruction address is generally expressed in byte units, and one instruction contains 4 bytes, 8 instructions is for example compared as 32 bytes. For the execution condition with respect to one branch instruction, the conditional code 205 (b-cond) may be used directly. However a branch condition should be synthesized if another branch instruction exists within the branch distance of a branch instruction.

Figure 6:
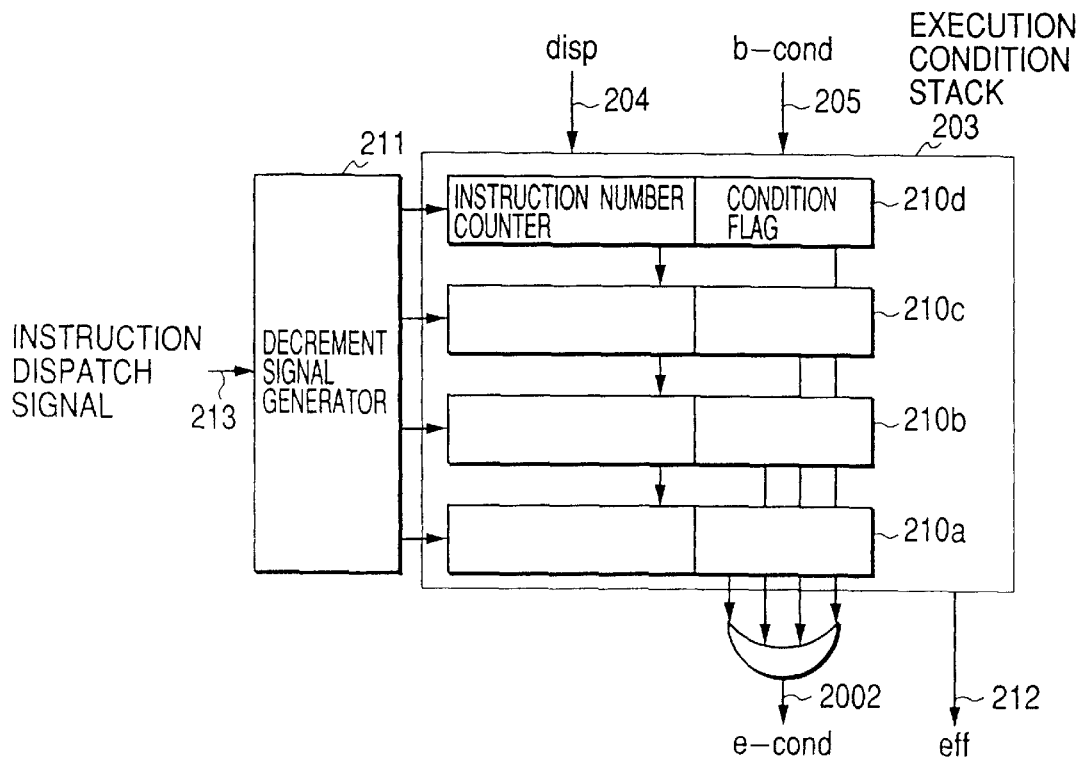
FIG. 6 is a block diagram of an execution condition stack.

The synthesis of this branch condition is performed by using the execution condition stack 203. FIG. 6 shows this execution condition stack 203. The stack comprises four stack elements designated by 210a–210d in FIG. 6, each element comprising an instruction counter and a condition flag. In the instruction counter, the value of the branch distance 204 (disp) of an instruction is directly entered, while the condition flag has the consents identical to the conditional code 205 (b-cond) of a conditional instruction.

Any stack element is disabled when the counter reaches 0, to displace the consents of an upper stack element toward the bottom in the figure one by one.

The fact that one or more valid stack elements exists in the execution condition stack 203 indicates the state that a conditional instruction is generated by at least one branch condition. This state that one or more stack elements exists is indicated by the valid signal 212 (eff) to the data latch in the branch distance judge unit 200. Although not shown in the embodiment of FIG. 1, each time one instruction is read out from the instruction buffer 100, an instruction dispatch signal 213 is generated, and a decrement signal generator 211 receiving this signal will decrement by one the value in the instruction counter in each stack element.

The execution condition 2002 (e-cond) indicates an execution condition synthesized from a plurality of branch conditions. More specifically, the execution condition 2002 (e-cond) is generated by a semantic logical AND (product) of the condition flag stored in the valid stack element. Thus, the synthesized execution condition should satisfy all of the execution conditions registered in the execution condition stack 203. As described above, branch distance judge unit 200 determines the branch distance by the branch instruction according to the present invention and generates execution conditions to be added to the instructions.

[Instruction Dispatcher 300]

Figure 7:
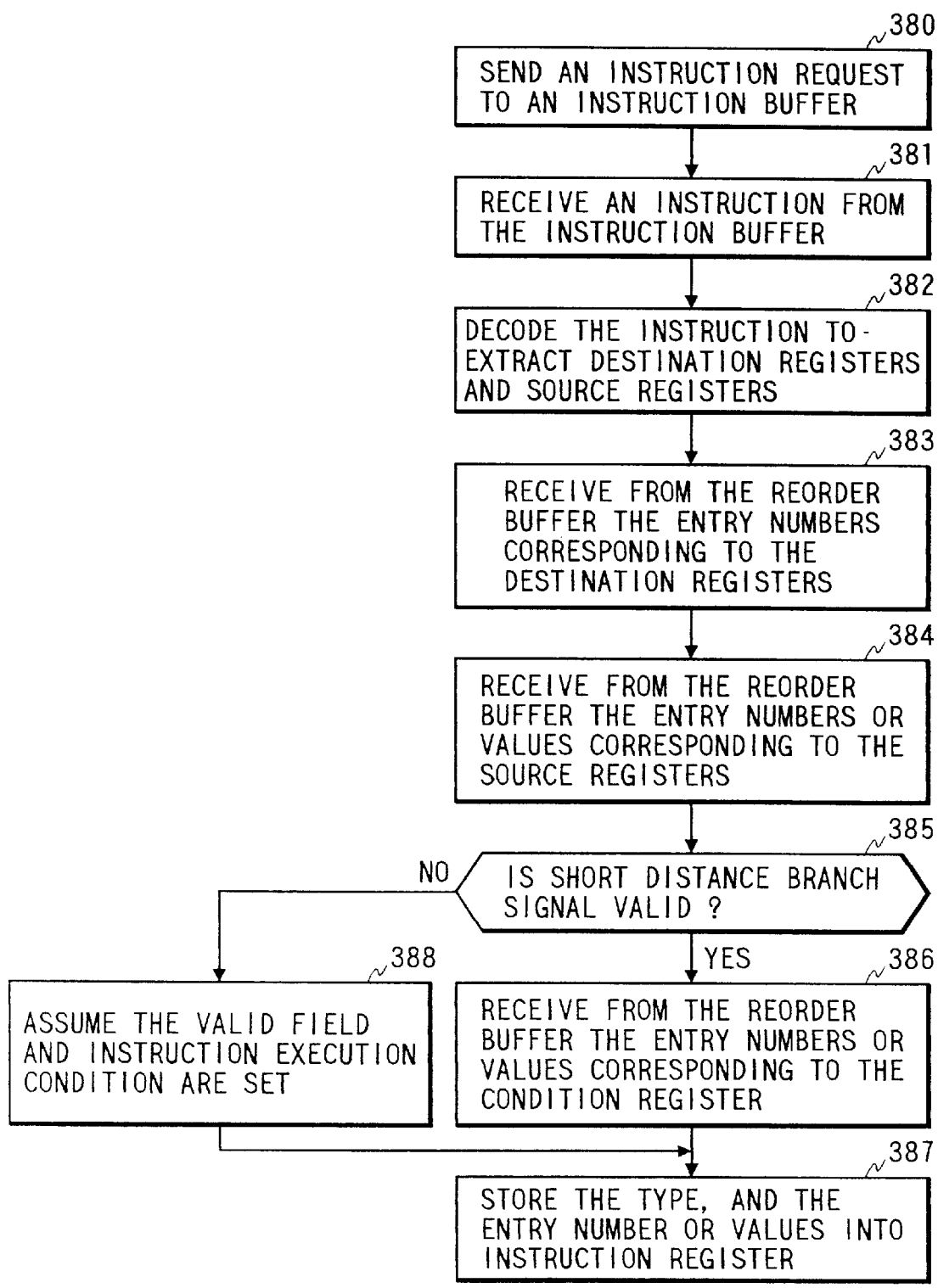
FIG. 7 is a flowchart illustrating the operation of a dispatcher.

The instruction dispatcher 300 performs the procedure shown in the flowchart of FIG. 7, as a sort of controller.

Initially, the circuit sends an instruction request signal 3001 (i-req) to the instruction buffer 100 (step 380), and then receives an instruction on the instruction output 1003 (step 381).

Then, the received instruction is decoded to extract field data, such as a destination register and a source register, according to the instruction (step 382). The destination register number, which is provided by the contents of a destination register, is transferred to the reorder buffer 500 as a destination register signal 3002, for retrieving a new entry number from the data part of reorder buffer 502 (step 383). The source register number of the source register is also transferred to the reorder buffer 500 as an operand register signal 3003 (op-reg) to retrieve the entry number of the data part of reorder buffer 502 if the preceding instruction is to alter the contents of the source register, or otherwise, the value stored in the register file 800.

Next, the circuit determines whether or not the short branch signal 2001 is valid (step 385), and if valid then performs step 386 of FIG. 7.

The branch instruction when the short branch signal 2001 is valid will be considered as follows. In accordance with the present invention, a branch instruction does not alter the instruction fetch address, but serves merely to notify to the waiting instructions in the instruction register 400 that the branch condition has been determined. More specifically, both the source registers and the destination registers are defined as registers specified by the branch register 2003 from the branch distance judge unit 200 to receive the entry number from the reorder buffer (step 386). As the short branch signal is valid, initialization is performed so as to do "execution condition=0 (untaken)" and "instruction issue condition=0 (unavailable)". While the short branch signal 2001 is valid, the entry number retrieved by the most recent branch instruction is the value to be stored in the "cond" field 407 in the instruction register 400. To perform this storage, step 387 of FIG. 7 will be performed.

By determining whether or not the short branch signal 2001 is valid, if not, step 388 of FIG. 7 will be performed.

In step 388, the branch distance of the branch instruction is greater than the reference distance so that, similar to the conventional process, valid data will be determined. The instruction to be registered to the instruction register should be "execution condition taken=1" when the execution condition defined herein is taken, and should be "instruction issue condition=0" when the condition record of instruction execution is not yet taken so that the instruction may not be issued to the instruction executing circuit 600. Thereafter step 387 of FIG. 7 will be performed.

Finally, the opcode (instruction type) decoded at step 382 and the entry number or the value of the operation result obtained from the reorder buffer 500 will be stored in the instruction register 400 by the operation of the registration circuit 402 in the instruction register, as will be described later. Especially in step 386, when replacing the name of the condition register at the reorder buffer 500, if the value of the operation result is returned rather than the entry number, it has already been determined whether a branch is taken by a branch instruction at the time of registering an instruction from this instruction dispatcher 300 to the instruction register 400.

Thus, although not described in the flowchart of FIG. 7, if the preceding instruction has already determined the branch condition, an instruction associated with its execution condition not be transferred to the instruction register 400 in step 387. Also, if not branched, then the process with respect to the conditional instruction can be accomplished to the extent of the operation of the instruction dispatcher 300 by registering to the instruction register 400 without adding any execution condition.

[Reorder Buffer 500]

Figure 8:
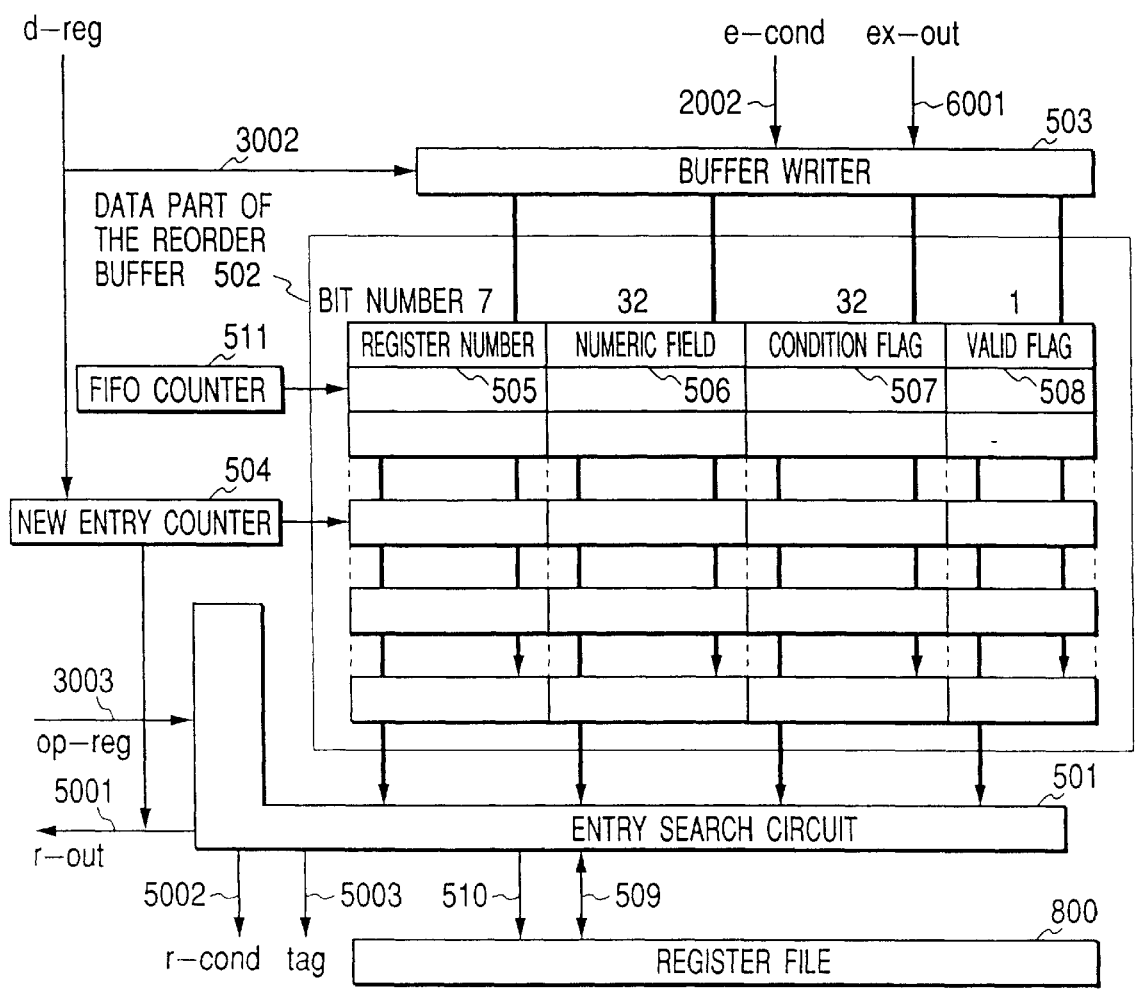
FIG. 8 is a block diagram of a reorder buffer.

FIG. 8 shows an example of the reorder buffer 500. The reorder buffer comprises a data part of reorder buffer 502 which enables an associative search by keying the register number, and its peripherals. The buffer has four basic operations as will be described below.

(1) New Entry Number Generation

The new entry counter 504 generates a new entry number for the data part of reorder buffer 502 with respect to the destination register decoded by the instruction dispatcher 300.

More specifically, the destination register number is entered via destination register signal 3002 (d-reg) to a buffer writing circuit 503 and to a new entry counter 504. In response to this input, the new entry counter 504 storing unused entry numbers in the data part of reorder buffer 502 generates a new unused entry number to send the generated unused entry number to the instruction register 400 as the reorder output 5001 (r-out) and to output a new writing location to the data part of reorder buffer 502.

At the same time, the buffer writing circuit 503 stores a destination register number into the register number field 505 at the position pointed to by the new entry counter. If at the instruction dispatcher 300 an instruction is added with an associated execution condition, the execution condition 2002 (e-cond) generated by the branch distance judge unit 200 is stored to the condition flag field 507 pointed to by that entry number at the time of generating the new entry number.

It is to be noted that the data part of reorder buffer 502 is realized as a FIFO queue (first-in-first-out queue) accessible with an entry number, so that after outputting an entry number, the new entry counter 504 may always retain a new entry number by incrementing its value.

(2) Operand Inquiry

In this operation, the source register number is input to the entry search circuit 501 through the operand register signal 3003 (op-reg). The entry search circuit 501 performs an associative search through the register number field 505 to return the most recently generated entry number among those matched to the source register number. The returned entry number is transferred to the instruction register 400 via the reorder output 5001 (r-out). At the time of the search, if there is no entry number with the register number matched to the source register number, the source register number is output to the address line 510 and the value of the source register stored in the register file 800 is obtained via the data line 509, so as to be output to the instruction register as a reorder output 5001 (r-out).

There may be cases in which two types of data, i.e., an entry number and numeric data are output to the reorder output 5001 (r-out). To distinguish them, there is also a tag signal 5003. If the tag signal 5003 is set to 1 then it indicates that the contents of reorder output 5001 (r-out) are an entry number, and if it is set to 0, then it indicates that the contents are numeric data stored in the register file 800.

(3) Newly Writing

The entry number sent from the instruction executing circuit 600 through the execution output 6001 (ex-out) and the numeric data of the execution result are stored in the data part of reorder buffer 502. Here the entry number is given instead of the destination register number of-the operative instruction. The buffer writing circuit 503 writes the value of the operation output to the numeric field 506 at the location pointed to by the entry number and sets the valid flag 508 of the same entry number to 1 at the same time.

(4) Completion

This operation may be executed any time rather than being initiated by any specific signal input. The FIFO counter 511 retains the oldest entry number assigned by the new entry number generation. In the completion, the valid flag 508 indicated by the FIFO counter 511 is checked, and if the valid flag is set to 1, the register number stored in the register number field 505 is output to the address line 510, and the numeric data stored in the numeric field 506 is output to the data line 509. Thereby, the values are stored in the register file 800. Finally, the valid flag 508 is set to 0 to increment the value in the FIFO counter 511 to complete the process for one entry. This operation will be iterated repeatedly until an entry having the valid flag set to 1 will be found, or the value in the FIFO counter 511 will become equal to the value in the new entry counter 504.

In the completion, there may be cases in which the valid flag 508 is set to 1 and the condition flag field 507 is also set. As will be described later, this indicates that the result of the completed branch instruction is stored. The valid flag then will be set to 0, and the numeric field 506 will be compared with the condition flag field 507 to output the result of comparison and the contents of the condition flag to the instruction register 400 via the condition output 5002.

(Instruction Register)

The instruction register 400 comprises eight instruction records 408 for storing instructions, a registration circuit 402 for registering instructions, and an instruction issuing circuit 401 for issuing executable instructions to the instruction executing circuit 600. Each instruction record 408 is divided into fields as shown in FIG. 9, including a "valid" field 403 including "F" and "C" bits, a type-of-instruction field 404, a DES field 405, an OP1 field 406a, an OP2 field 406b, and a "cond" field 407. The DES field 405, the OP1 field 406a, the OP2 field 406b, and the "cond" field 407 are associatively searchable. In addition, at the top of the OP1 field 406a, the OP2 field 406b, and the "cond" field 407, the tag fields 409a, 409b, and 409c are attached to indicate that, if the tag is set to 1, then the data in the field corresponding to that tag is an entry number of the reorder buffer 500.

The instruction register 400 performs instruction registration, instruction completion, and instruction issue. These operations along with the number of the register will be described hereinbelow.

(1) Instruction Registration

The instruction decoded at the instruction dispatcher 300 will be stored Lo the record searched by the registration circuit 402 with all fields being 0. The opcode in the decoded information will be stored in the type-of-instruction field 404, and the destination register number and source register number are stored, after replacing the name as described above, in the operation of the data part of reorder buffer 502, into the DES field 405, OP1 field 406a, and OP2 field 406b, respectively. In case of conditional instructions, the condition register number for generating the execution condition will be stored into "cond" field 407 after replacing the name at the reorder buffer 500.

(2) Instruction Completion

The completion begins with entering, through the execution output 6001 (ex-out), the entry number of the data part of reorder buffer 502 in which the operation output is to be stored, and the value of the operation output. The registration circuit 402 then searches the OP1 field 406a and OP2 field 406b of the instruction record 408, and when it find an entry number input together with the operation output, it replaces the entry number with the output value, and resets the associated tag fields 409a or 409b thereof to 0. If the tag fields 409a, 409b, and 409c of the instruction record 408 which indicates that the replacement has been performed is set to 0, then the F bit of the "valid" field 403 will be set to 1 (indicating instruction issue available).

In case of branch instructions, a similar operation begins at the time when the reorder output 5001 and the condition output 5002 are input. From the reorder output 5001, there is provided the result of comparison of the entry number, corresponding to the condition register storing the branch condition of the completed branch instruction, with the execution condition generated at the branch distance judge unit 200 in advance. The registration circuit 402 searches the "cond" field 407 of the instruction record 408 to reset to 0 the tag field 409a associated with the "cond" field 407 of the instruction record retaining the identical entry number. Thereafter the C bit of the "valid" field 403 will be set to 1 (indicating execution condition taken).

(3) Instruction Issue

This operation will be performed independent of any external signal from the instruction register 400. The issuing circuit 401 searches the "valid" field 403 of all of the instruction records 408 to check for an instruction record with the code "11" being set (indicating instruction issue available and execution condition taken), so as to transfer the contents of the type-of-instruction field 404, DES field 405, OP1 field 406a, and OP2 field 406b to the instruction executing circuit 600 corresponding to the opcode stored in the a type-of-instruction field 404. The instruction record, after outputting these contents, will be reset for all bits to 0 in order to reuse it for the next instruction registration.

When searching the "valid" field 403, if an instruction record having a code "10" (instruction issue available and execution condition untaken) is found, the following operation will be performed. In FIG. 8, the entry number of the data part of the reorder buffer stored in the DES field 405 (referred to as the entry 1 herein) is used for obtaining the register number field 505 in the data part of the reorder buffer 502. The entry search circuit 501 then searches the data part of reorder buffer 502 for an entry number which is maximum among those less than the entry number having the same register number and stored in the instruction register 400 (referred to as the entry 2 herein).

The searched and found entry 2 will be returned to the instruction register 400 to replace therewith those having an entry 1 from all of the OP1 fields 406a and OP2 fields 406b of the instruction records 408. This is for disabling any instruction records 408 of instruction issue available and execution condition untaken. Essentially, the instructions may be erasable by resetting to 0 all fields in the instruction record 408 with this condition being taken. However, the above mentioned exception processing will be performed in order to prevent the instructions from waiting for the execution of other conditional instructions which are not removed from the instruction register 400.

If an appropriate entry number is not found by searching the data part of reorder buffer 502, indicating that there is no instruction waiting for the execution result from the instruction to be deleted, then the instruction record will be deleted by setting all bits in the record to 0 according to that principle.

(Instruction Execution Unit)

The instruction execution unit does not contain any specific novel component according to the present invention, and it may be formed by such usual elements as a floating point unit, a fixed point unit, a load/store operating unit and so on.

Second Embodiment

Figure 10:
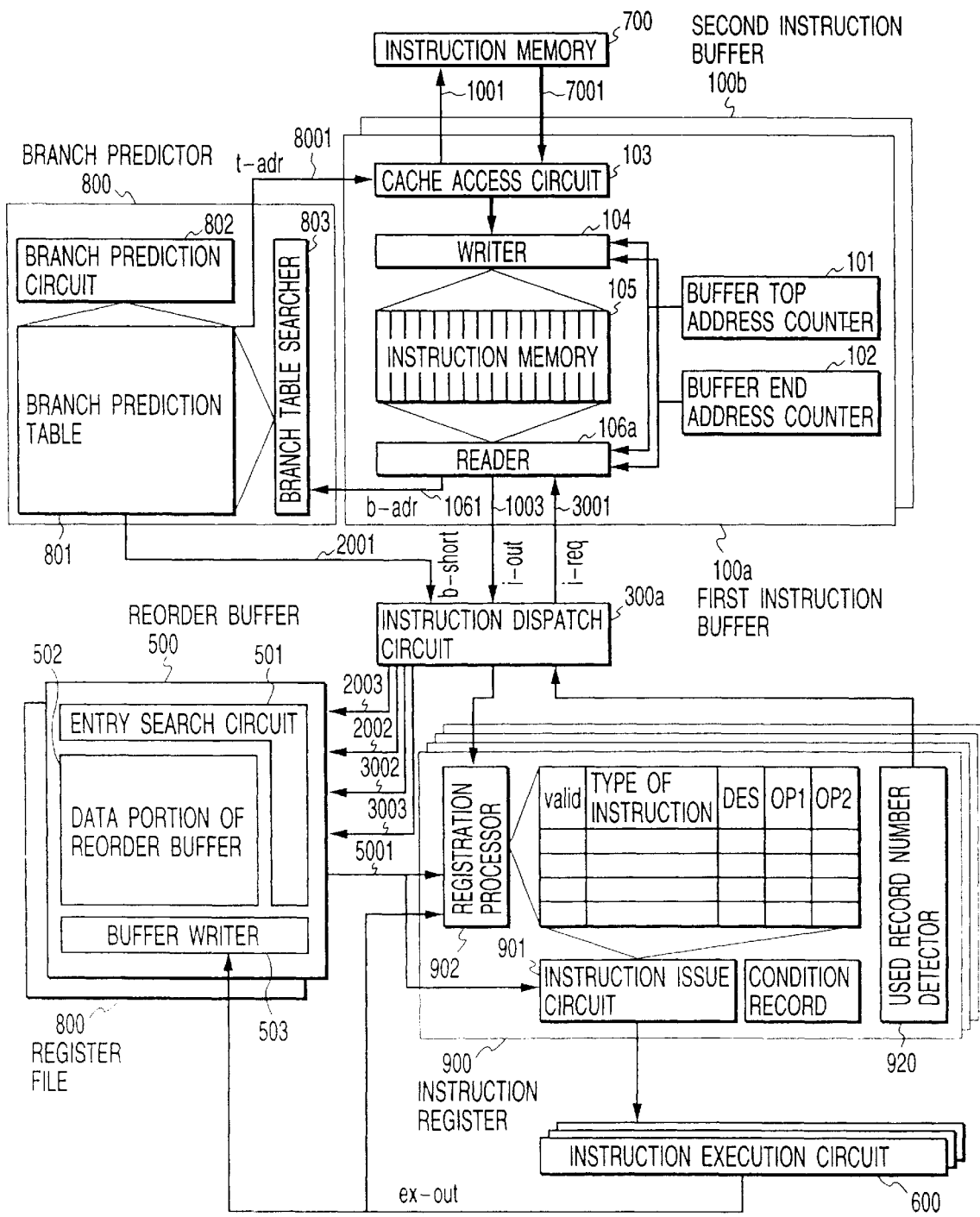
FIG. 10 is a block diagram of an apparatus for information processing according to a second embodiment of the present invention.

FIG. 10 shows another preferred embodiment according to the present invention. In this embodiment, the method for generating instructions with an execution condition from a branch condition, and the method for executing instructions with conditions are the same as in the preceding embodiment described above. This embodiment is different from the preceding one in that it has a plurality of instruction buffers, in that it has a branch predictor 800 instead of the branch distance judge unit 200 to effect processing by combining branch prediction with distance judgment, and in that it has instruction registers separated for each execution condition.

First instruction buffer 100a comprises the same components as the instruction buffer 100 shown in FIG. 1 and 2. However, the branch predictor 800 requires an address to which the instruction for the branch instruction was stored, so that it outputs a branch instruction address 1061 (b-adr) instead of the branch operand 1002. Second instruction buffer 100b, comprising the same input/output signals to the first instruction buffer 100a, has the same functionality as the first instruction buffer 100a. In this buffer, based on the result registered in the branch predictor 800, when forward or backward branching farther than the referenced distance, the branch target address will be transferred through the target address 8001 to the second instruction buffer 100b, and the sequence of instructions at the branch target will be stored in the instruction storage 105 of the second instruction buffer 100b by the operation of the accessing circuit 103.

The branch predictor 800 comprises a branch prediction table 801, a branch prediction unit 802, and a branch table searching unit 803, as shown in FIG. 11. The branch prediction table may retain the contents of a branch instruction address 805, a prediction bit 806, a branch target address 807, and a short distance flag 808. The table can be associatively searched by keying with the branch instruction address 805. The branch predictor 800 performs two sorts of operations; one is for branch prediction when a branch instruction is read out from either the first instruction buffer 100a or the second instruction buffer 100b, and the other is for updating the contents of the branch prediction table 801 when a branch instruction is executed by the instruction executing circuit 600.

When a branch instruction is read out from either the first instruction buffer 100a or the second instruction buffer 100b, the address of the branch instruction stored therein will be transferred through the branch instruction address 1061 to the branch table searching unit 803, which searches the branch prediction table 801 by keying the branch instruction address, and if it finds a matched branch instruction, the branch table searching unit 803 outputs the branch target address 807 stored therein as the target address 8001.

In such a case, if the short distance flag 808 contains "1", indicating that the branch distance of this branch instruction is shorter than the predetermined reference distance, then the short branch signal 2001 will be enabled. The short branch signal 2001 is also input to the first instruction buffer 100a and the second instruction buffer 100b in order for the second instruction buffer 100b to fetch instructions based on the target address 8001, if the short branch signal 2001 is not enabled.

The branch instruction at the instruction executing circuit 600 computes the address of the branch target and determines the branch condition. The information management in the branch prediction table 801 is keyed with the address storing that branch instruction so that the instruction dispatcher 300a and the instruction register 900 retain the address of the stored instruction in the unused bit field with respect to the branch instruction to sequentially propagate information until the branch instruction execution is completed. The address of the branch target and the result of determination of a branch will be transferred to the branch prediction unit 802 via a branched target address signal 880 and a taken signal 881, respectively. At the same time the offset information for computing the branch target address used for computing the address of the branch target will also be transferred via disp signal 882.

As described above, the branch prediction unit-802 updates the contents of the branch prediction table 801, according to the address of the branch target and the result of either a taken or untaken branch being generated each time a branch instruction is executed. At first, the branch table searching unit 803 searches the branch prediction table by keying the address for a branch instruction to be stored, and then, if it finds an address corresponding to the branch instruction address 805, the record will be the subject to be updated by the branch prediction unit 802.

The method of update is shown in FIG. 12. The prediction bit 806 of the branch prediction table 801, taken signal 881, and disp signal 882 are used for input information, to output the short distance flag 808 and the prediction bits 806, as well as the branch target address 807, based on the result of prediction. In the branch prediction method shown in FIG. 12, a branch is predicted to be untaken when the prediction bits are 00 and 01, and a branch is to be taken when the bits are 01 and 11. The transition between four states of the prediction bits is indicated by the taken signal 881. That is, when a branch is taken, the prediction bits transit in the direction from 00 through 01, then 10 to 11, and when a branch is untaken the bits transit in the opposite direction from 11 through 10 then 01 to 00. When it is predicted that a branch will be taken, the contents of the branch target address signal 880 will be stored in the branch target address 807, otherwise, the instruction address next to the branch instruction will be stored in the branch target address 807.

In the present embodiment, in order to retain the status of a short branch as prediction bit 806 in the branch prediction table, "1" will be stored in the prediction bit 806 if the disp signal 882 is shorter than the predetermined distance. In the address search of the branch instructions at the branch table searching unit 803 as described above, if there is not found any address suitable for the branch instruction address 805, then a new record will be created in the branch prediction table 801.

Now referring again to FIG. 10, another embodiment of the instruction register 900 will be described below. The instruction register 900 retains in its instruction records 908 the instructions waiting for execution, similar to the instruction register 400 shown in FIG. 1. The "valid" field 903 comprises only one bit indicating whether instruction issue is available or not, for managing the execution conditions in batch by the condition record 912 described later. The type-of-instruction field 904, DES field 905, OP1 field 906a, and OP2 field 906b are equivalent to the "valid" field 403, type-of-instruction field 404, DES field 405, OP1 field 406a, and OP2 field 406b in the instruction register 400 with respect to their structure and functionality. The instruction register 900 is characterized in that there are a plurality of instruction registers, each having an associated condition record 912. More specifically, a plurality of instruction registers correspond to condition registers, and the number of the condition register specified for the execution condition determines which of the instruction registers will be used. As the basic operation is identical to that of the instruction register 400, only the points which are different therefrom will be described below.

(1) Instruction Registration

In the instruction registration, plural instruction registers are selected for storing an instruction in response to the execution condition associated with the instruction with the execution condition.

(2) Instruction Completion

When a branch instruction is completed, the entry number of the condition register to be an execution condition is input from the reorder output 5001. Since at the time of completion of the branch instruction the contents of the condition register have been determined, the entry number may be read as a condition register number so that it can be determined which instruction register 900 should be used based on this condition register number. The condition record 912 attached to the instruction register 900 being used provides two bits i.e., "F" and "C" bits. The F bit of the condition record 912 will be set to 1 at the time when it is determined which instruction register 900 is to be used. Also, a comparison is made in the reorder buffer 500 to see if the contents of the determined condition register matches the execution condition, so that the "C" flag of the condition record 912 is set to 1 if matched.

(3) Instruction Issue

The instruction issue circuit 901 searches the tag bit 910 of all of the condition records 912 to perform the following instruction issue operation on all instruction records 908 contained in the instruction register 900 where the "F" bit is set. By searching the "valid" field 903 of instruction records 908 and finding out all instruction records where "1" is set, the consents of the type-of-instruction field 904, DES field 905 OP1 field 906a, and OP2 field 906b will be sent to the instruction executing circuit 600 corresponding to the opcode stored in the type-of-instruction field 904. After sending these contents, all bits in the instruction records will be reset to 0 for subsequent use in another instruction registration. At this point, if the "C" bit of the condition record 912 is set to 0, then the invalidating process of a conditional instruction will be performed as described with respect to the operation of the instruction register 400. The structure and the operation of the instruction register 900 have been described above.

In the first embodiment described above, the conditional instruction will not be transferred to the instruction executing circuit 600 until its execution condition has been determined so that no instruction will be executed. However, the instructions with any input date prepared will be executed before establishment of their condition (the execution of instructions before conditions are established is referred to as a "speculative execution"). An instruction may be disabled within the reorder buffer 500 if its execution condition is not taken. The actual control thereof is performed in the instruction dispatcher 300a.

Figures 13, 14:
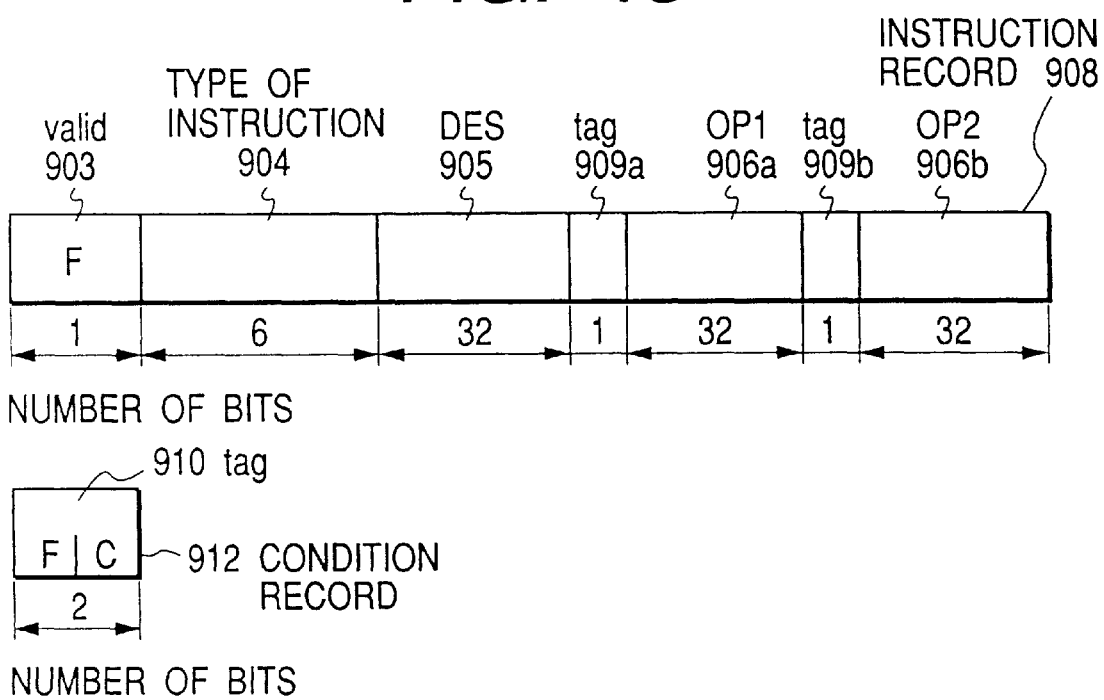
FIG. 13 is a diagram of an instruction register used in the apparatus shown in FIG. 10.
FIG. 14 is a speculative execution table based on branch prediction.

More specifically, the control is performed according to the table shown in FIG. 14 by using information on the branch prediction from the branch predictor 800 as input data When the branch prediction judge predicts that a branch will be taken, no speculative execution will be performed regardless of its branch distance. However, if the prediction unit predicts that a branch will be untaken, then that branch will be speculatively executed. An instruction which is subject to be speculatively executed is allowed to be executed before establishment of its execution condition by setting its "F" flag in the condition record 912 to 1 when registered from the instruction dispatcher 300a to the instruction register 900. In the controlling method shown in FIG. 14, the condition of simultaneously fetching instructions to the second instruction buffer 100b is also shown. If the branch distance is short, then the instruction already stored in the first instruction buffer is to be used, so that no instruction will be fetched to the second instruction buffer. on the other hand, if the branch distance is long, or if the branch jumps back, instruction fetching to the second instruction buffer will be performed.

The feature of controlling a speculative execution, as described above, embodies primarily a control based on branch prediction. Therefore the control method shown in FIG. 14 is especially not fixed. For instance, as shown in FIG. 15, although the branch prediction predicts that a branch will be taken, the control may be readily achieved if speculatively executed. In addition, it is not necessarily required that input information to be referred to for controlling a speculative execution be limited to the information on branch prediction.

In the controlling method shown in FIG. 16, the number of used instruction records is detected by the used record number detector 920 in the instruction register 900. If the number exceeds a predetermined limit (for example, 7), the speculative execution may be suppressed without reference to the resulting branch prediction. In such a manner, the present invention allows the speculative execution, based on the detected signal in an apparatus for information processing, to be entirely and easily controlled by explicitly retaining an execution condition in the instruction register.

The present invention has been described above with reference to first and second embodiments. It should be noted that the combination of the components comprised in the first and second embodiments, such as the instruction buffer, branch predictor, branch distance judge, and instruction register, is not limited to the respective embodiment. Rather, these components are allowed to tee combined one with another from either embodiment.

Although in the first and second embodiment a complete apparatus for information processing has been embodied as an example, the present invention may be used as a method or an apparatus for supplying instructions to means for executing instructions, which means may be a conventional processor. For example, in the apparatus for information processing shown in FIG. 17, all means up to the instruction dispatcher 300a are used as means for generating instructions with an execution condition along with branch instructions, the instructions generated being executed by an in-order processor 900 of the consecutive sequence type. The instruction register 900 of FIG. 10 has the function of transferring instructions consecutively to the instruction executor in the order of instructions which have been prepared with an execution condition and any necessary numeric values of input operands required for executing the instructions. With this function, there is the likelihood that the instruction order at the stage of execution differs from that in the instruction memory 700. Since the order of storing values into the register fife 800 has to conform with the order in the instruction memory 700, the reorder buffer has, at its completion, the function of sorting back the operation outputs in the order that instructions passed through the instruction dispatcher 300a.

Figure 17:
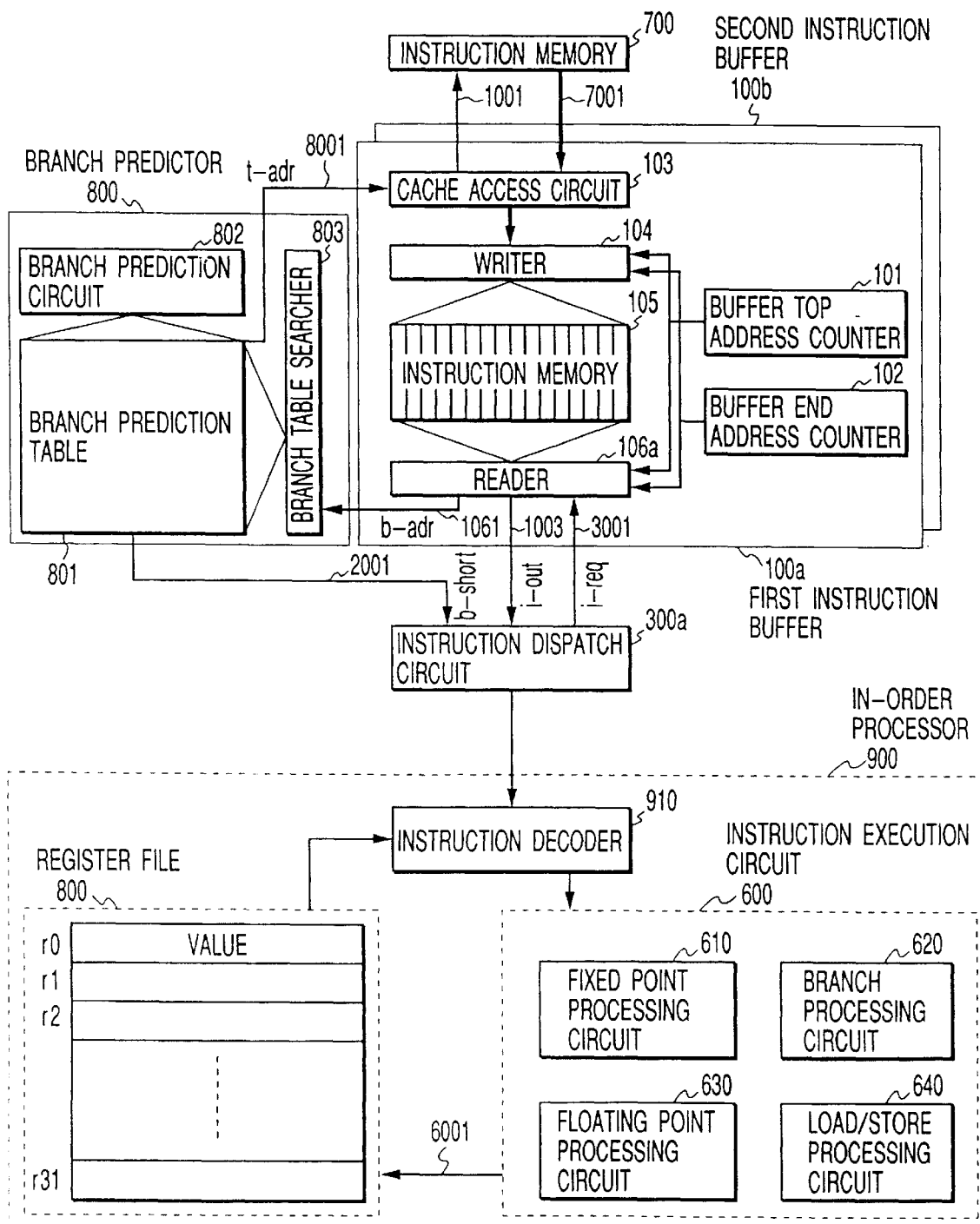
FIG. 17 is a block diagram of another embodiment illustrating the combination of the present invention with an in-order executable processor.

In the embodiment shown in FIG. 17, the in-order processor 900 operates by conforming to the order in which the instructions passed through the instruction dispatcher 300a. The instruction decoder 910 retrieves input data from the register file 800 to transfer it to the instruction executing circuit 600. The instruction executing circuit 600 is comprised of, similar to the embodiments described above, processing unite suitable for the type of computation, such as a fixed point unit 610, branch processing circuit 620, floating point unit 630, and load/store processing circuit 640.

As noted above, the instruction executing circuit 600, which comprises a plurality of operating units, enables instructions of any different combinations to be simultaneously executed in a parallel fashion. The resulting values from the execution will be written back to the register file 800 as the operating output 6001.

Figure 18:
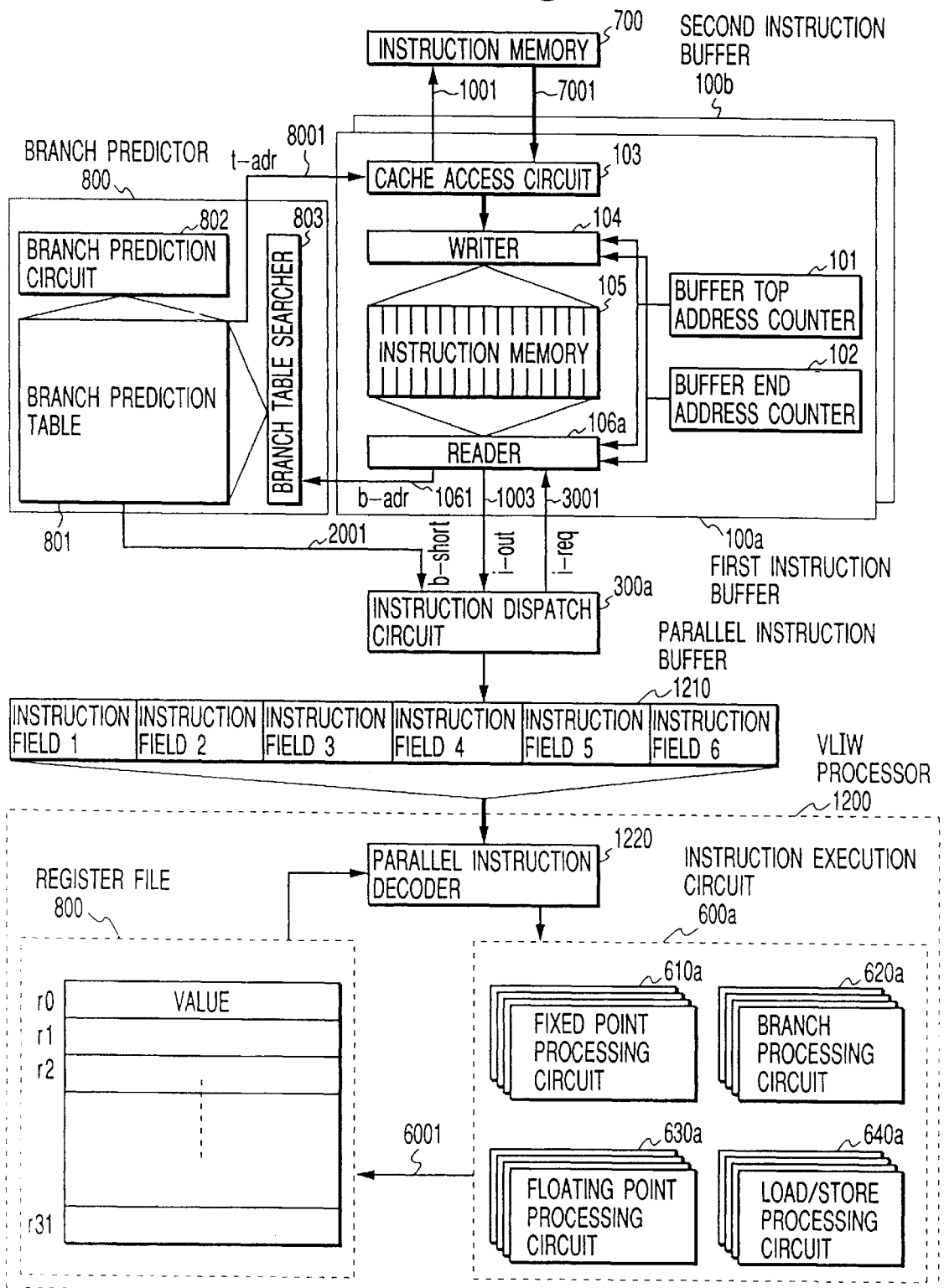
FIG. 18 is a block diagram of yet another embodiment illustrating the combination of the present invention with a VLIW processor.

FIG. 18 is another embodiment with a VLIW (Very Long Instruction Word) processor used for its instruction executing means. An instruction issued from the instruction dispatcher 300a is stored temporarily into a parallel instruction buffer 1210. The parallel instruction buffer 1210 is divided into six instruction fields, each field storing sequentially the instruction transferred from the instruction dispatcher 300a. When the instruction fields of the parallel instruction buffer 1210 become full, all instruction fields are sent to the VLIW processor 1200 as instruction words. A parallel instruction decoder 1220 reads input data for the respective instructions stored in the instruction field from the register file 800 to send to a respective processing unit of the instruction executing unit 600a according to the type of operation. The instruction executing unit 600a provides a plurality of operating units which process the same type of instructions for allowing instructions of the same type to be executed in parallel. The number of instruction fields in the parallel instruction buffer 1210 described above may be determined with respect to the number of executable instructions in parallel in the instruction executing unit 600a. Rather than six instruction fields as embodied herein, the number of fields may be expanded to, for example, eight.

The embodiment using the VLIW processor 1200 as shown in FIG. 18 is formed such that consecutively executable instructions may be stored in the parallel instruction buffer 1210. This example, similar to the embodiment shown in FIG. 1, allows any means for resolving dependency among input data concerned with the instruction execution to be combined by using instruction register 400. For instance, by providing instruction registers 400 either within or very close to the instruction dispatcher 300a of FIG. 18, the instructions with the dependency resolved among input data may be stored in the parallel instruction buffer 1210. As a variant, inserting the instruction register 400 immediately before the parallel instruction decoder 1220 allows the function of resolving dependency among input data to be provided to the VLIW processor 1200 itself.

According to the present invention, in a case in which the branched target instructions of a branch instruction are already in the instruction buffer, or exist at such a short distance that they can be retrieved into the instruction buffer by using conventional instruction fetching, a series of instructions following a branch instruction may be registered into the execution queuing register as a conditional instruction, without altering the destination of the instruction fetching.

According to the present invention, the waiting time for instruction fetches will not be created. For example, the execution of instructions will not be interfered with even if there are a series of branches. In addition, the present invention has the effect that the series of instructions of both a branch taken and a branch untaken are executed, so that the penalty of miss-prediction of a branch will be minimized.

What is claimed is:

1. A method of branch operation for an apparatus for information processing having an instruction buffer for storing fetched instructions to be executed, an instruction register for storing instructions queued for execution until preparation for execution of each of the queued instructions is ascertained to be completed, and an instruction execution unit which executes instructions in parallel, said method comprising the steps of:

detecting a branch instruction stored in said instruction buffer;

determining the distance and condition of said branch instruction;

if said branch distance is less than a predetermined positive distance, providing each of following instructions located within said branch distance of said branch condition as an execution condition to store said following instructions in the instruction register as conditioned instructions; and sending each of said instructions stored in said instruction register to said instruction execution unit, when preparation for execution of each of said instructions is ascertained to be completed, to be executed.

2. A method of branch operation according to claim 1, further comprising the steps of:

determining a prediction as to whether a branch will be taken or untaken for each branch instruction, and the branching target address;

among instructions stored in said instruction register, sending the instruction with a branch condition of a branch instruction predicted to be untaken, being attached as an execution condition, to said instruction execution unit without waiting for the establishment of a branch condition.

3. A method of branch operation according to claim 1 or 2, further comprising:

if the number of use of the instruction register or of the instruction execution unit is greater than a predefined value, suppressing sending instructions executable among those stored in said instruction register to said instruction execution unit.

4. A method of branch operation according to claim 1, further comprising:

if there is a second branch instruction between a first branch instruction and branching target instructions of that first branch instruction, providing the instruction located within said predetermined distance with an execution condition of logical product of the branch condition of said first branch instruction and the branch condition of said second branch instruction for storing into the instruction register.

5. A method of branch operation in an apparatus for information processing having an instruction buffer for storing fetched instructions to be executed, a plurality of instruction registers for storing instructions queued for execution until preparation for execution of each of the queued instructions is ascertained to be completed, and an instruction execution unit which may execute instructions in parallel, wherein said plurality of instruction registers are provided for each respective execution condition, said method comprising the steps of:

detecting a branch instruction stored in said instruction buffer;

determining the distance and condition of said branch instruction;

if said branch distance is less than a predetermined positive distance, providing each of following instructions located within said determined distance of said branch condition as an execution condition to store said following instructions in one of said instruction registers; and sending each of the instructions stored in said one instruction register to said instruction execution unit, when preparation for execution of each of said instructions is ascertained to be completed, to be executed.

6. An apparatus for information processing having an instruction buffer for storing fetched instructions to be executed, an instruction register for storing instructions queued for execution until preparation for execution of each of said queued instructions is ascertained to be completed, and an instruction execution unit which may execute instructions in parallel and to which prepared instructions are sent from said instruction register to be executed, said apparatus comprising:

a branch distance judge circuit for decoding a branch distance and a branch condition from a branch instruction;

an instruction buffer reader for sending the topmost branch instruction stored in said instruction buffer to said branch distance judge circuit before preceding instructions; and means for providing each of following instructions which, if said branch distance is less than a predetermined positive distance, are located within said branch distance with said branch condition as an execution condition and for dispatching said following instructions to said instruction register to be stored as conditional instructions.

7. An apparatus for information processing according to claim 6, wherein said execution condition is represented by a plurality of bits, said plurality of bits containing the branch prediction result from a branch prediction.

8. An apparatus of information processing according to claim 6, further comprising:

a detector for detecting when the number of use of the instruction register or of the instruction execution unit exceeds a predefined value;

said execution condition comprising the detector output from said.

9. An apparatus for information processing according to claim 6, wherein there are provided a plurality of instruction registers for each respective execution condition; and each of said instruction registers retains one of said execution conditions.

* * * * *